United States Patent [19]
Post

[11] Patent Number: 5,946,318
[45] Date of Patent: Aug. 31, 1999

[54] METHOD AND APPARATUS FOR PROCESSING AND PACKETIZING DATA FROM A DATA STREAM

[75] Inventor: Lauren Lee Post, Pflugerville, Tex.

[73] Assignee: International Business Machines Corporation, Armonk, N.Y.

[21] Appl. No.: 08/822,318

[22] Filed: Mar. 21, 1997

[51] Int. Cl.[6] .................................................. H04J 3/24
[52] U.S. Cl. ........................................ 370/412; 370/473
[58] Field of Search .................................... 370/473, 474, 370/471, 412, 428, 429, 356, 493, 490

[56] References Cited

U.S. PATENT DOCUMENTS

| | | | |
|---|---|---|---|
| 4,777,595 | 10/1988 | Strecker et al. | 370/474 |
| 4,920,534 | 4/1990 | Adelmann et al. | 370/94.1 |

(List continued on next page.)

FOREIGN PATENT DOCUMENTS

| | | | |
|---|---|---|---|
| 0 609 128 | 1/1994 | European Pat. Off. | G06F 13/38 |
| 0 735 484 | 2/1996 | European Pat. Off. | G06F 12/08 |
| 07107116 | 10/1993 | Japan | H04L 12/56 |
| 07177179 | 7/1995 | Japan | H04L 12/56 |
| WO 95/22233 | 8/1995 | WIPO | H04Q 11/04 |
| WO 96/15598 | 5/1996 | WIPO | H04J 3/02 |

OTHER PUBLICATIONS

Information technology—Coding of moving pictures and associated audio for digital storage media at up to about 1,5 Mbit/s—Part 1: Systems; ISO/IEC 1993; Reference no. ISO/IEC 11172–1:1993(B).

Information technology—Coding of moving pictures and associated audio for digital storage media at up to about 1,5 Mbit/s—Part 2: Video; ISO/IEC 1993; Reference no. ISO/IEC 11172–2:1993(B).

Information technology—Coding of moving pictures and associated audio for digital storage media at up to about 1,5 Mbit/s—Part 3: Audio; ISO/IEC 1993; Reference no. ISO/IEC 11172–3:1993(E).

OpenMPEG Multiplatform API Specification Version 1.03; OpenMPEG Consortium, Mountain View, CA; Revision Date: May 9, 1996.

Information Technology—Generic Coding of Moving Pictures and Associated Audio: Systems, Recommendation H.222.0; International Organisation for Standardisation Organisation Internationale De Normalisation ISO/IEC JTC1/SC29/WG11; Coding of Moving Pictures and Associated Audio; N0801 rev; Apr. 21, 1995.

Information Technology—Generic Coding of Moving Pictures and Associated Audio Information: Video, Recommendation ITU.T H.262; International Organisation for Standardisation Organisation Internationale De Normalisation ISO/IEC JTC1/SC29/WG11; Coding of Moving Pictures and Associated Audio; N0802 ISO/IEC 13818–2rev, Draft of Nov. 9, 1994.

*Primary Examiner*—Hassan Kizou
*Assistant Examiner*—Daniel Previl
*Attorney, Agent, or Firm*—Duke W. Yee; Jeffrey S. LaBaw

[57] ABSTRACT

An improved method and apparatus for processing a data stream containing multiple data packets, which can contain audio or video data. The present invention parses a data stream until it reaches the start of a packet containing audio or video data. This data is bundled by the present invention. For data packets crossing over multiple buffers, multiple bundles are created. One bundle for packets crossing multiple buffers can be made if the data it maps to can be coalesced into a discrete continuous buffer. Information is associated with this bundle containing the first and last buffer indexes such that when the bundle is consumed, the corresponding buffers can be released. Otherwise, a separate bundle will be created for each separate buffer until the end of the packet is reached and when all bundles for an associated buffer are consumed then the buffer can be released.

33 Claims, 17 Drawing Sheets

U.S. PATENT DOCUMENTS

| | | | |
|---|---|---|---|
| 5,276,684 | 1/1994 | Pearson | 370/94.1 |
| 5,339,421 | 8/1994 | Housel et al. | 395/700 |
| 5,450,410 | 9/1995 | Hluchyj et al. | 370/94.1 |
| 5,481,543 | 1/1996 | Veltman | 370/473 |
| 5,483,526 | 1/1996 | Ben-Nun et al. | 370/60.1 |
| 5,483,640 | 1/1996 | Isfeld et al. | 395/200.03 |
| 5,487,167 | 1/1996 | Dinallo et al. | 395/650 |
| 5,491,800 | 2/1996 | Goldsmith et al. | 395/200.12 |
| 5,519,699 | 5/1996 | Ohsawa | 370/60 |
| 5,528,587 | 6/1996 | Galand et al. | 370/60 |
| 5,537,408 | 7/1996 | Branstad et al. | 370/473 |
| 5,541,920 | 7/1996 | Angle et al. | 370/61 |
| 5,561,791 | 10/1996 | Mendelson et al. | 395/550 |
| 5,574,885 | 11/1996 | Denzel et al. | 395/492 |
| 5,644,310 | 7/1997 | Laczko, Sr. et al. | 431/143 |

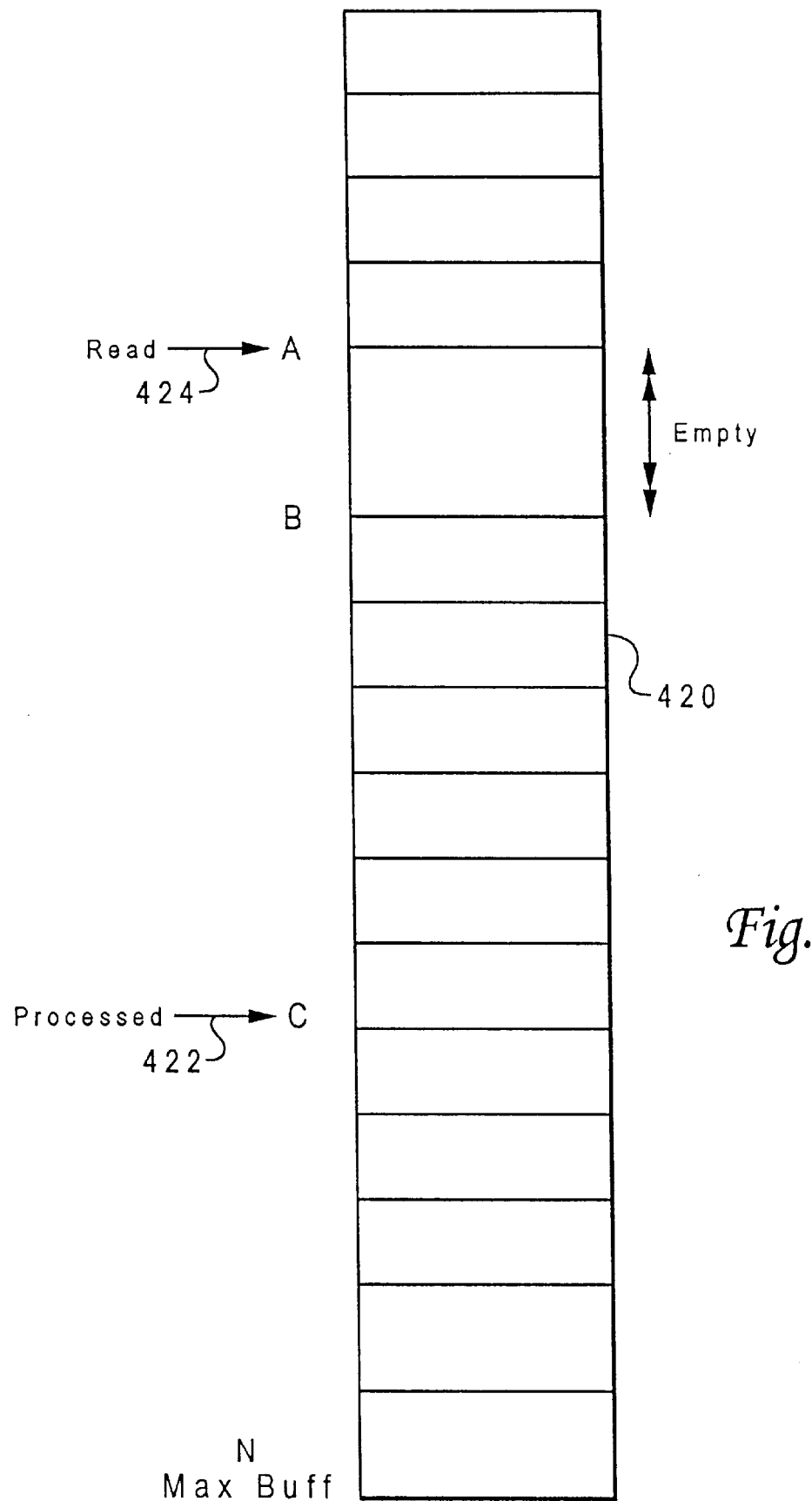

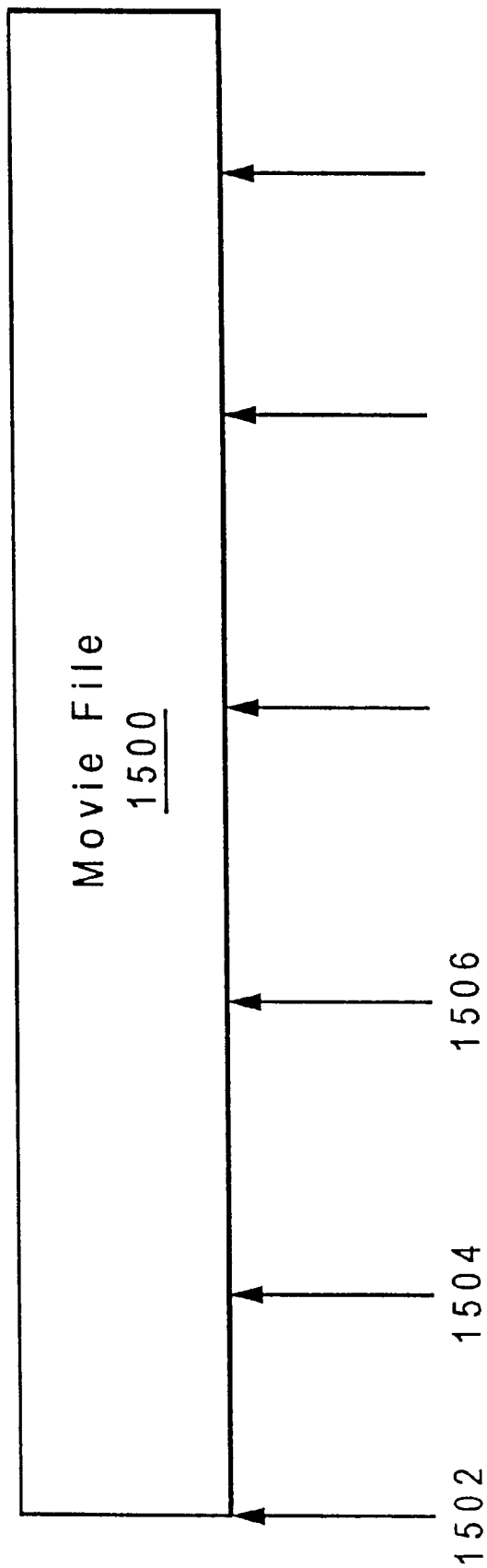

METHOD AND APPARATUS FOR PROCESSING AND PACKETIZING DATA FROM A DATA STREAM

BACKGROUND OF THE INVENTION

1. Technical Field

The present invention relates generally to an improved data processing system and in particular to a method and apparatus for processing a data stream. Still more particularly, the present invention relates to a method and apparatus for processing and packetizing a data stream for improved data throughput.

2. Description of the Related Art

Multimedia, the presentation or transfer of information through more than one medium at any time, is a fast crowing segment of the computer industry with many applications being developed, which incorporate various features of multimedia. Additionally, many businesses are using multimedia to present information to consumers. Multimedia combines different forms of media in the communication of information to a user through a data processing system, such as a personal computer. A multimedia application is an application that uses different forms of communications within a single application. For example, multimedia applications may communicate data to a user through a computer via audio and video simultaneously. Such multimedia applications are usually bit intensive, real time, and very demanding, requiring ample processing power in the data processing system. Users may access in the multimedia, for example, in the form of video games or movies on a digital video disk (DVD) or through a communications link.

As our multimedia content is more increasingly residing on external devices such as network servers, and through interactive applications, there is a need for the engine processing multimedia content to not do the standard file input reads but be able to accept data from an application via buffered play. One use of buffered play is an application can either receive data from a network server and pass buffers to an engine for processing and display to the user. Another use is for an interactive application to read its own content and perform seek operations to different parts of the content based on user's actions in the application.

Interactive applications will pass buffers of the data they read from their content to the engine for processing and display to the user. For server content, an client application could receive data from a server over a network and package into buffers that can be sent to an engine for processing and display. For interactive applications, an application would create content in which different scene changes occur at exact byte positions. These scene changes would be keyed off based on user input. An interactive application can do this because content is created so seamless scene changes can occur to the user. The user has multiple possibilities of outcomes without waste of content by matching scenes to different scenes.

It is very expensive for an engine to do seeks because it must do verification and checking to assume correct positioning. If an application has control over the content, the application can do the seeks to the correct scene positions and the engine will transparently play from the new position based on the new content the application is providing. When the engine does a seek, the engine must stop the playback, seek to specified position and skip data until a position is found that contains a correct sync point for audio and video. This process puts more burden on the application but also gives it much more control over the content, especially for interactivity. When the data is passed from the application to an engine for processing, the data must be parsed into recognizable audio and video segments known as packets if using MPEG content. These audio and video packets can be passed to audio and video decoders respectively and ultimately to the speaker and display. Difficulty comes in when dealing with these buffers and their range in size. One problem is that the audio or video segments might span multiple buffers. It would be expensive to recopy the data into internal buffers, and is faster to use the existing buffers as placeholder until they are entirely consumed by the decoders. If the data is copied and coalesced into internal buffers, it is also difficult to manage the original buffers that match the data. Additionally, when data packets straddle buffers, difficulty occurs in processing data types in packets that cross from the end of one buffer to the beginning of the next.

Therefore, it would be desirable to have an improved method and apparatus for processing and packetizing data from a data stream to improve data throughput and provide smoothness in multimedia presentations.

SUMMARY OF THE INVENTION

It is one object of the present invention to provide and improve data processing system.

It is another object of the present invention to provide a method and apparatus for processing a data stream.

It is yet another object of the present invention to provide a method and apparatus for processing and packetizing a data stream for improved throughput.

The foregoing objectives are achieved as follows.

The present invention provides an improved method and apparatus for processing a data stream containing multiple data packets, which can be audio or video data. The present invention parses a data stream until it reaches the start of a video or audio packet. This data is bundled by the present invention. For data packets crossing over multiple buffers, multiple bundles are created. One bundle for packets crossing multiple buffers can be made if the data it maps to can be coalesced into a discrete continuous buffer. Information is associated with this bundle containing the first and last buffer indexes such that when the bundles are consumed, the corresponding buffers can be released. Otherwise, a separate bundle will be created for each separate buffer until the end of the packet is reached.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred motive use, further objects and advantages thereof, will be best understood by reference to the following detailed description of an illustrative embodiment when read in conjunction with the accompanying drawings, wherein:

FIGS. 4A and 4B are diagrams of an array of buffers according to the present invention;

FIG. 15 is a diagram of a movie file containing different scenes according to the present invention.

DETAILED DESCRIPTION OF THE PREFERRED EMBODIMENT

Figure 1A:
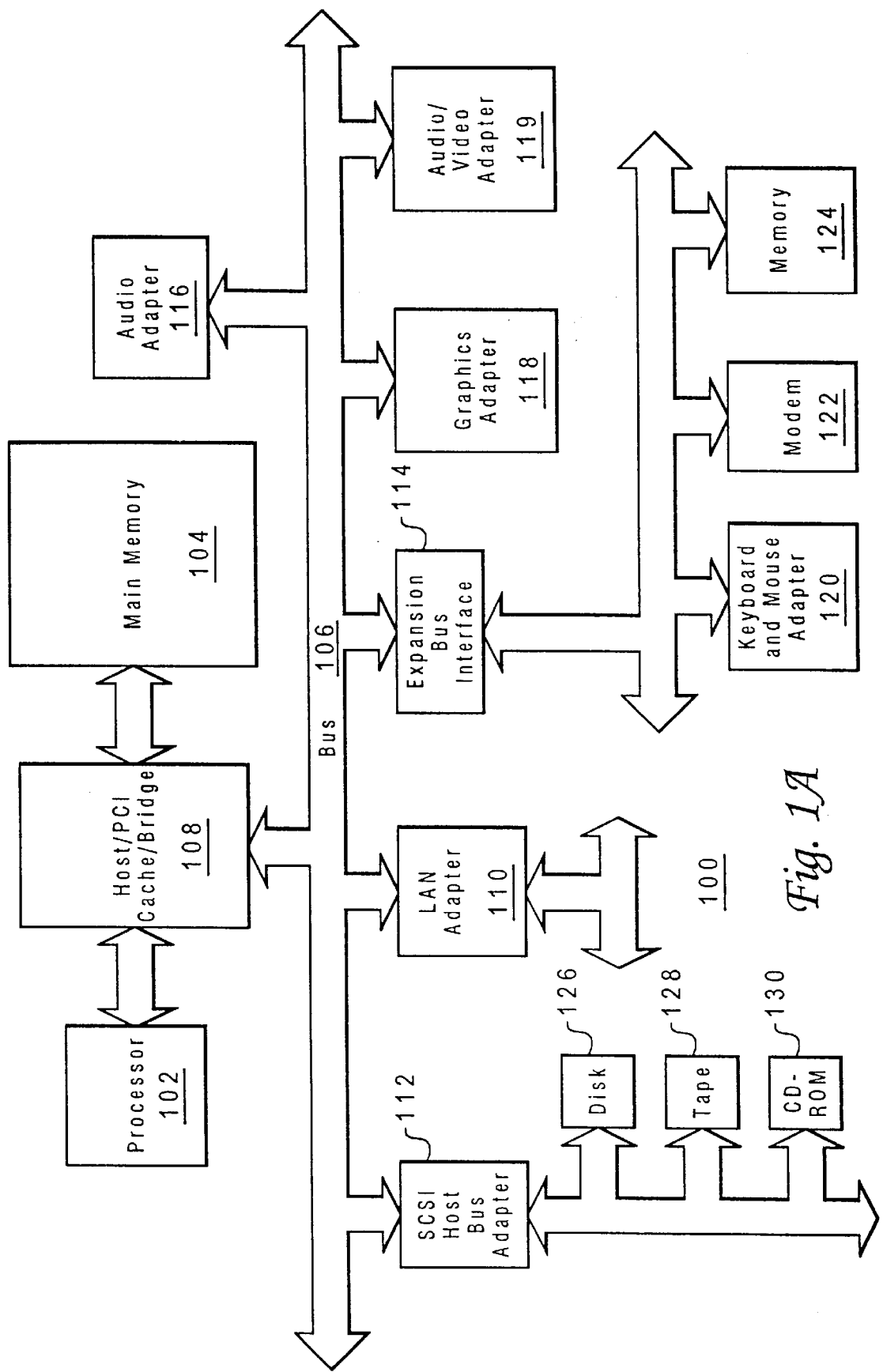
FIG. 1A is a block diagram of a data processing system in which the present invention may be implemented.

With reference now to the figures, and in particular with reference to FIG. 1A, a block diagram of a data processing system 100 in which the present invention may be implemented is illustrated. Data processing system 100 employs a peripheral component interconnect (PCI) local bus architecture. Other bus architectures such as ISA and Micro Channel may be employed. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example.

Figure 1B:
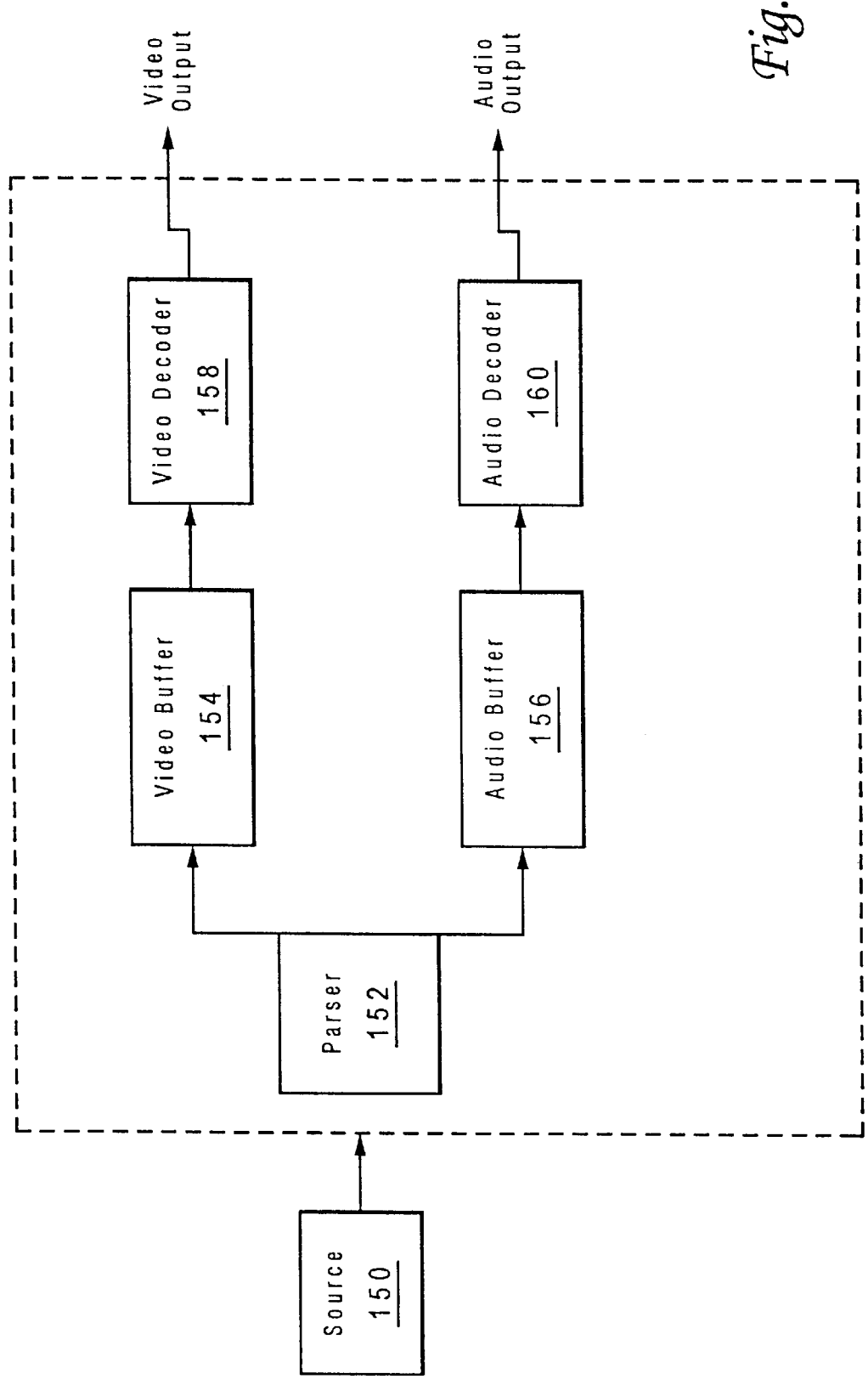
FIG. 1B is a block diagram of an audio/visual adapter illustrated in FIG. 1A according to the present invention.

In FIG. 1B, a block diagram of a audio/video adapter is depicted from FIG. 1A according to the present invention. A/V adapter 119 has an input connected to source 150 which may be a digital storage media, such as hard disk 126 or CD-ROM 130. Alternatively, source 150 may be a data stream from a remote source received through LAN adapter 110. Parser 152 separates video data from audio data with video data being sent to video buffer 154 and audio data being sent to audio buffer 156. Video decoder 158 is employed to synchronize and decode or drop video frames to produce a video output. Audio decoder 160 is employed to decode audio to create an audio output for the multimedia presentation. The decoding performed by A/V adapter 119 may be implemented using the MPEG standard. The processes of the present invention may be implemented within A/V adapter 119.

A solution for managing buffers is described by this invention. MPEG terminology is used for this invention in which a system stream contains multiple packets each which can contain audio or video data (or private data which is discarded). The packets start with a packet start designation, then a packet type designating whether audio, video or etc (private). After the packet type, a packet length describes the length of the packet including the information just described. Some packets may also contain extra information such as timing (Presentation Time Stamp—PTS). A PTS indicates a time that the units for a packet are to be presented. One of ordinary skill in the art will appreciate that the present invention may be applied to other types of audio/visual data.

Figure 2:
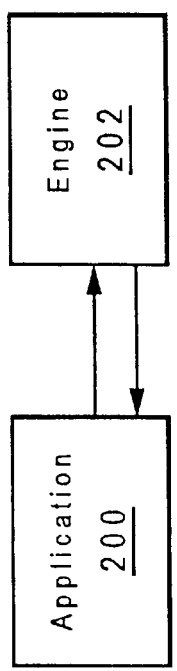
FIG. 2 is a block diagram of components used to implement the processes of the present invention.

With reference to FIG. 2, a block diagram of components used to implement the processes of the present invention are depicted. Application 200 sends data to engine 202, which performs the processes described in the flowcharts below. In the depicted example, buffers located in application address space are employed to store data processed by engine 202. Alternatively, engine 202 may have buffers in its own address space. A parser in engine 202 will process a system stream until it reaches a packet start, then parse over the beginning packet information until it reaches the actual packet data which is bundled and later sent to the appropriate decoder for the data type. For packets spanning over multiple buffers, the parser will create multiple bundles with descriptions containing the first and last buffer indexes so when the bundles are consumed the corresponding buffers can be released back to the application. If the audio and video data is coalesced into separate internal buffers then one bundle can be created that maps to multiple buffers. A bundle is a pointer to a discrete continuous unit of data. A packet may contain multiple bundles and the data pointed to by the bundles is the data that will be decoded. One bundle for packets crossing over multiple buffers can only be made if the data it maps to is coalesced into a discrete continuous buffer. Otherwise a separate bundle will be created for each separate buffer until the end of packet is reached.

Figure 3A:
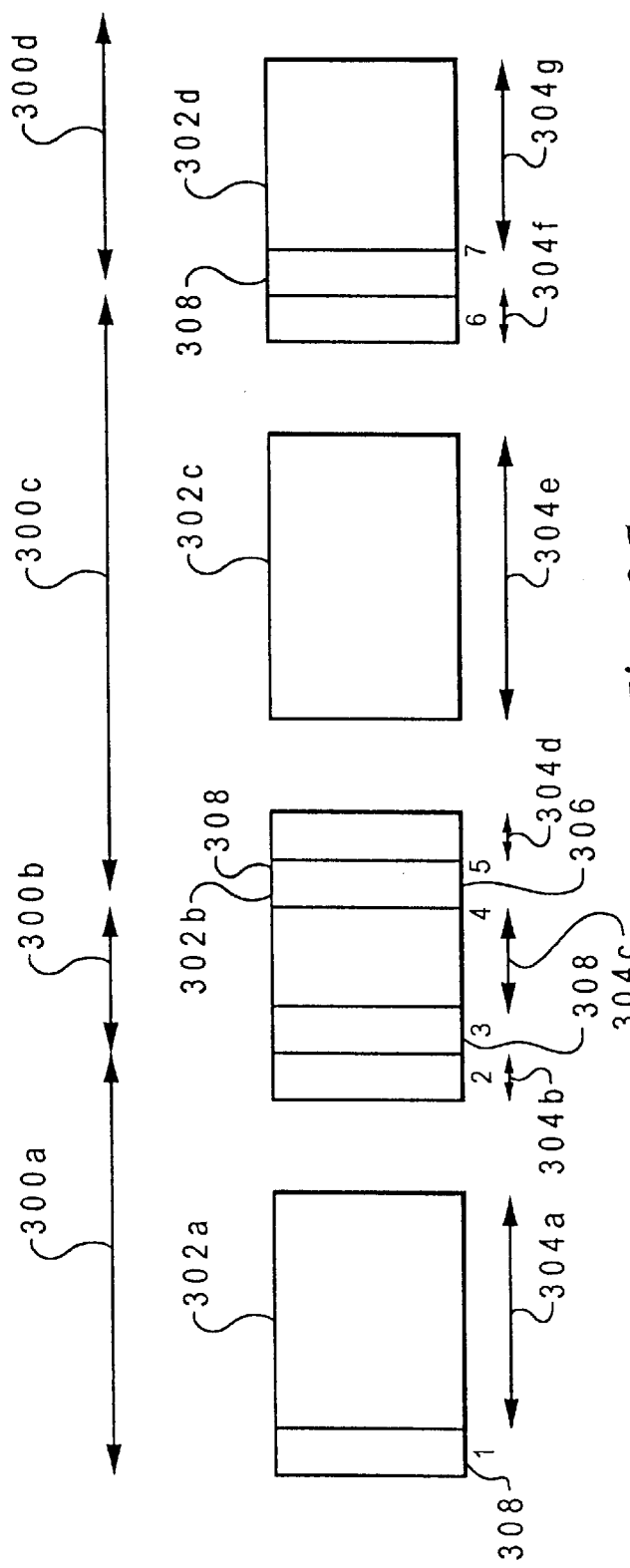
FIGS. 3A–3C are diagrams of data layout in buffers according to the present invention.

In FIG. 3A, diagrams of data layout in buffers is depicted according to the present invention. In FIG. 3A, a diagram of data packets spanning a number of buffers is illustrated and the bundles of packet data. In the depicted example, packets 300a–300d span across buffers 302a–302d. From these packets, bundles 304a–304g are formed in which each bundle maps to continuous data without crossing over to a different buffer. In particular, data in packet 300a forms bundles 304a and 304b. Packet 300b is used to form bundle 304c. Bundles 304d–304f are formed from the data in packet 300c. Packet 300d is used to create bundle 304g. Sections 308 are unused data from the data packets, such as the headers of the packets.

Figure 3B:
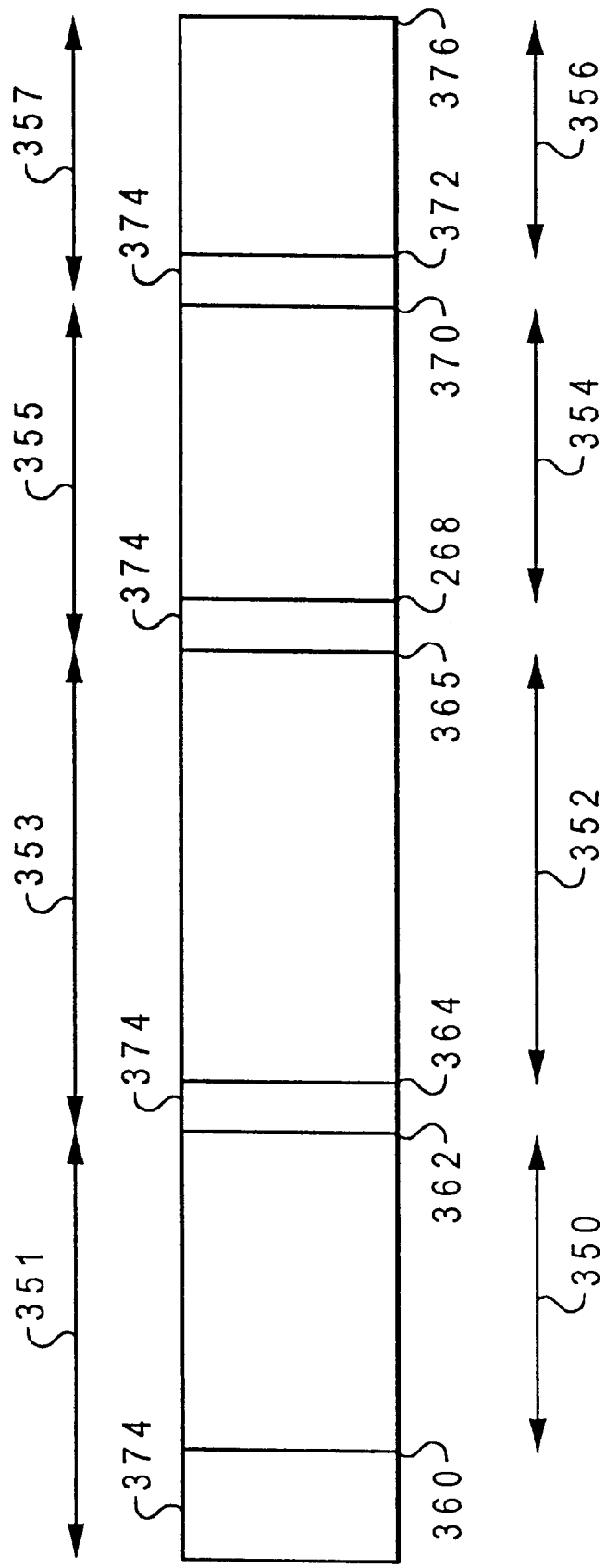

In FIG. 3B, the packets are contained within a single buffer. Packets 351, 353, 355 and 357 are found in buffer 358 corresponding to bundles 350, 352, 354 and 356 respectively. Buffer 358 can not be released until all bundles within it are consumed. Sections 374 are unused or header portions of the data packets.

Figure 3C:
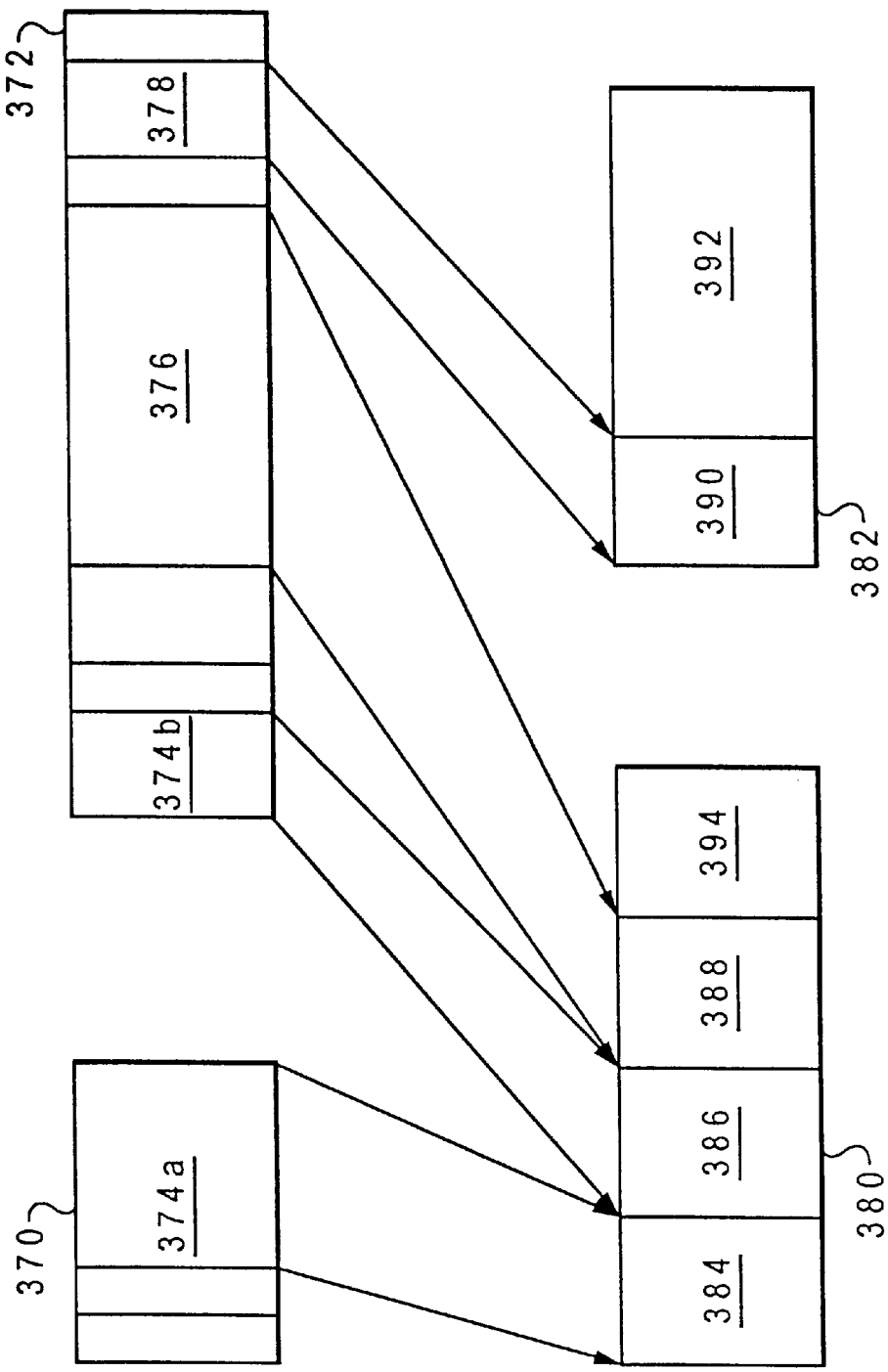

FIG. 3C is an illustration of the mapping of coalesced data into hardware buffers. In the depicted example, buffers 370 and 372 contain data packets. A video data packet is stored in section 374a of buffer 370 and in section 374b of buffer 372. Another video packet is stored entirely in section 376 of buffer 372. Section 378 of buffer 372 contains an audio packet. These data packets are copied into an internal video buffer 380 or an internal audio buffer 382. These internal buffers are buffers located within engine address space, such as within audio/video adapter 119 in FIG. 1A. As can be seen, data from section 374a is copied into section 384 while data in section 374b is copied into section 386 in the internal video buffer 380. The data from the video packet in section 376 in buffer 372 is copied into section 388 in buffer 380. The data for the audio data packet in section 378 is copied into section 390 of internal audio buffer 382. Bundle 1 containing data in sections 384, 386, and 388, is created for the video data in the internal video buffer matching to buffers 370 and 372. Bundle 2, containing data in section 390, is created from the audio data in buffer 372. Section 392 in internal audio buffer 382 and section 394 in internal video buffer 380 remain unused. In the depicted examples, the buffers are not circular and are returned to the application when all data is consumed within a buffer.

Figure 4A:
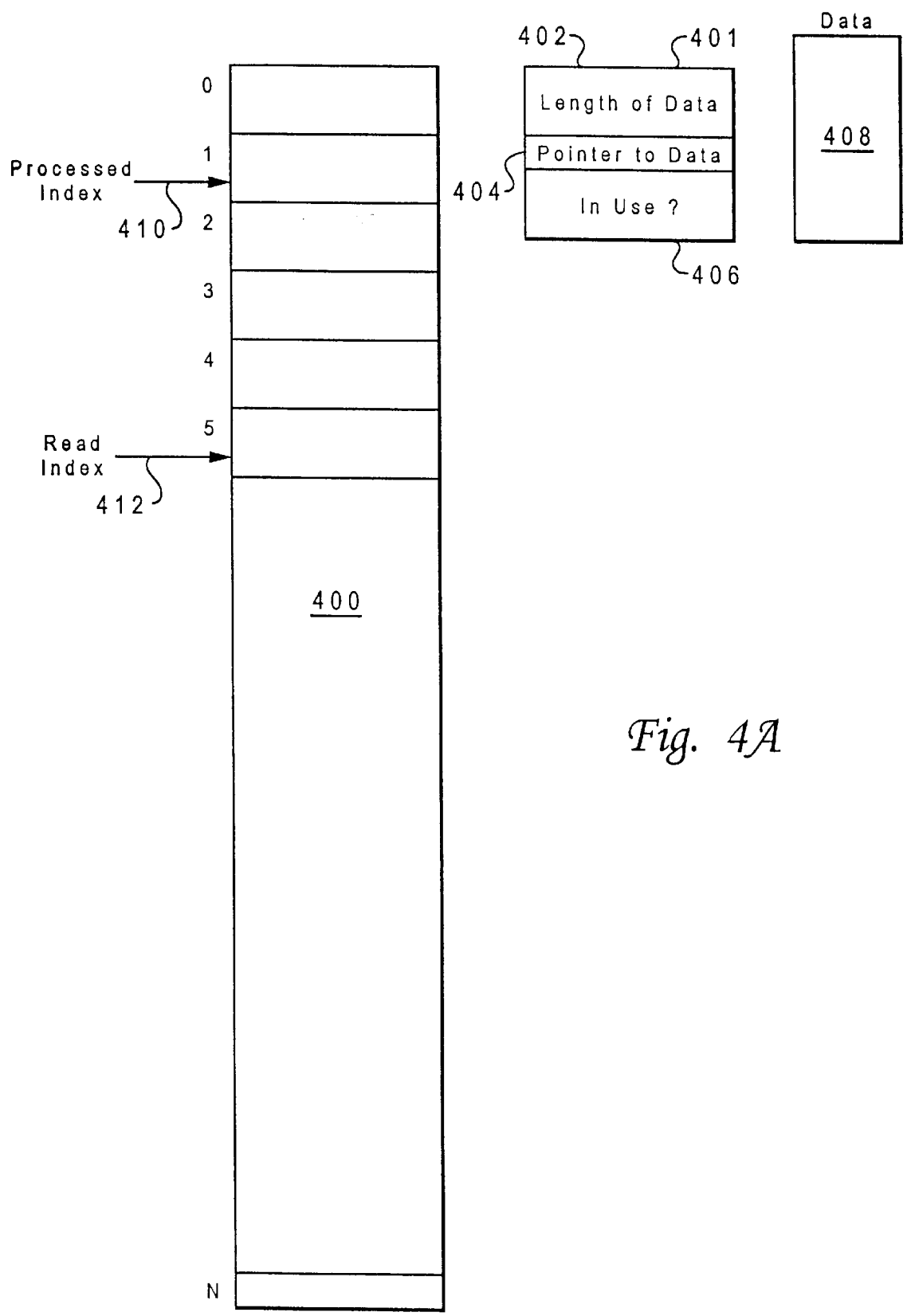

With reference now to FIG. 4A, an array of buffers is depicted according to the present invention. Array 400 includes elements 0 to N. Array 400 is a circular array in the depicted example. Each element in array 400 includes a pointer to a data structure 401, which contains the length of the data field 402, a pointer 404 to data 408, and an indication field 406 as to whether the buffer is in use. Pointer 404 points to a data structure describing the data. This is the data structure that contains data being packetized.

A processed index pointer 410 and a read index pointer 412 are employed in the array. Processed index pointer 410 and read index pointer 412 will reset to the beginning of the array when the end of array 400 is reached the next time each of the pointers are incremented. In the depicted example, buffers 0–5 have been read from the application and buffers 0 and 1 have been processed into packets.

Turning next to FIG. 4B, an array of buffers is depicted according to the present invention. In array 420, read index pointer 422 is pointing to A while the processed index pointer 423 is pointing to C in the array of buffers. In the depicted example, the application has looped through the array of buffers once. All buffers have been read and all buffers have been processed through the first loop by the engine. Buffers up to the read index pointer 424 have been consumed. New buffers have been read up to point A. Elements between point A and B are empty because the buffers have been consumed and new buffers have not yet been read into the array. The elements from point B to point C is full of buffers that have been processed into packets and are in use. In the depicted example, the area from point C to point N have been read in. The processed pointer at point C is the point from which the next buffer will be packetized. From point C to point N and point 0 to point A, these buffers can be processed. The buffers read within array 420 are buffers containing pointers to the data structure for the array such as in FIG. 4A. The buffers containing data for packetizing are different buffers, which are pointed to by the data structure.

Figure 5:
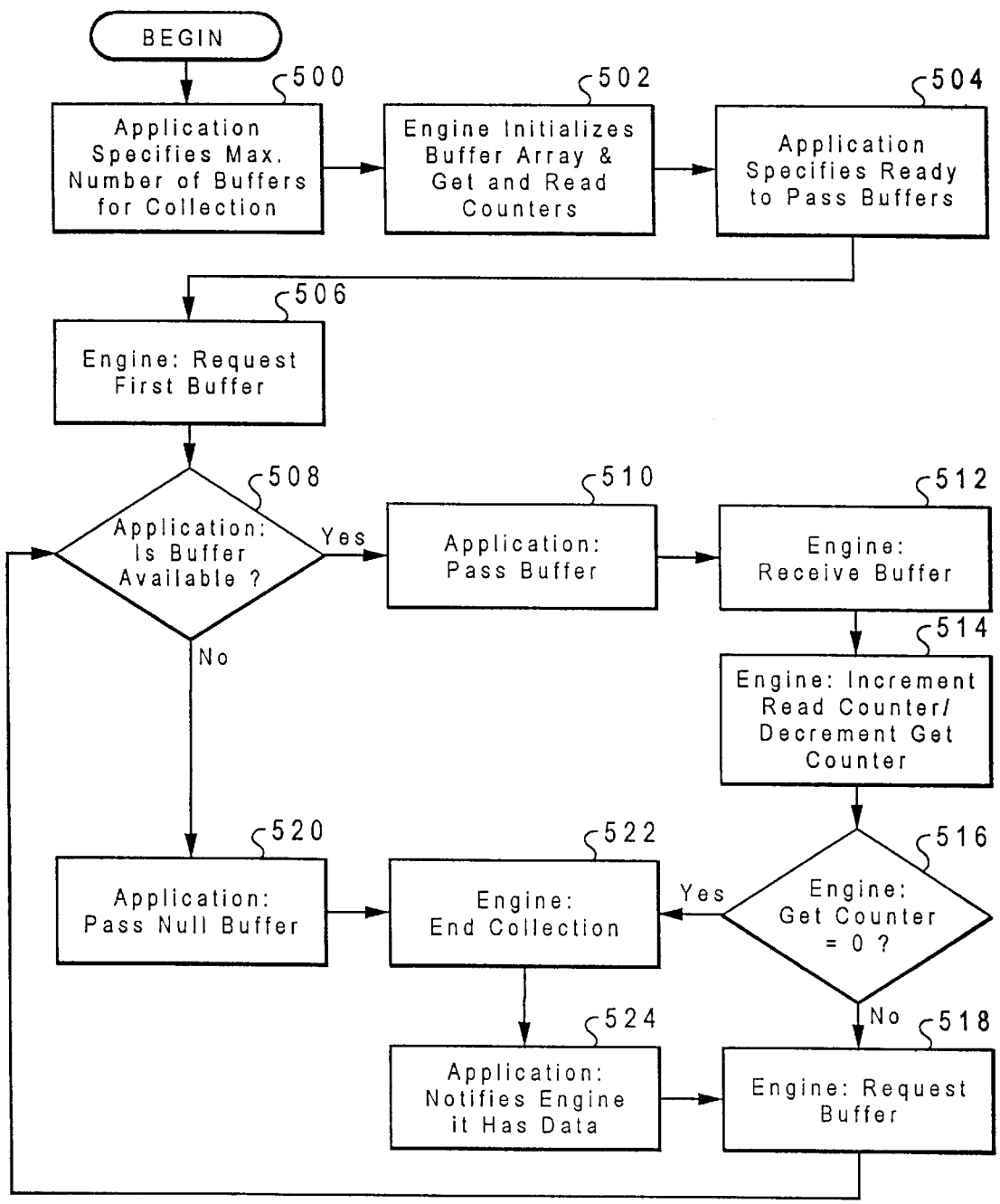
FIG. 5 is a flowchart of a process to collect buffers from an application according to the present invention.

With reference now to FIG. 5, a flowchart of a process to collect buffers from an application is depicted according to the present invention. The process begins by the application specifying a maximum number of buffers for collection (step 500). The maximum number of buffers specified by the application is the number of buffers that the application uses for passing data to the engine and that number depends on the particular application. The engine uses the number of buffers specified by the application so that the engine is using the same number of buffers as the application. The engine then initializes a buffer array and the Get and Read counters (step 502). Thereafter, the application specifies that it is ready to pass buffers (step 504). The first buffer is then requested (step 506). After the request for the first buffer, a determination is made by the application as to whether a buffer is available (step 508). If a buffer is available, then the buffer is passed by the application (step 510). The buffer is passed via a pointer to the data structure described by 402 in FIG. 4A. The buffer is received by the engine (step 512). The Read counter is incremented and the Get counter is decremented by the engine after the buffer is received (step 514). Thereafter, a determination is made as to whether the Get counter is set equal to zero by the engine (step 516). In other words, a determination is made as to whether the buffer array is full. If the Get counter is not equal to zero, the process then requests another buffer (step 518) with the process then returning to step 508 as previously described. With reference back to step 508, if a buffer is not available, the application then passes a null buffer to the engine (step 520). Thereafter, the collection of buffers for use in processing data for the engine ends (step 522) until the application notifies the engine that it has data (step 524). Thereafter, the process proceeds to step 518 as previously described.

Figure 6:
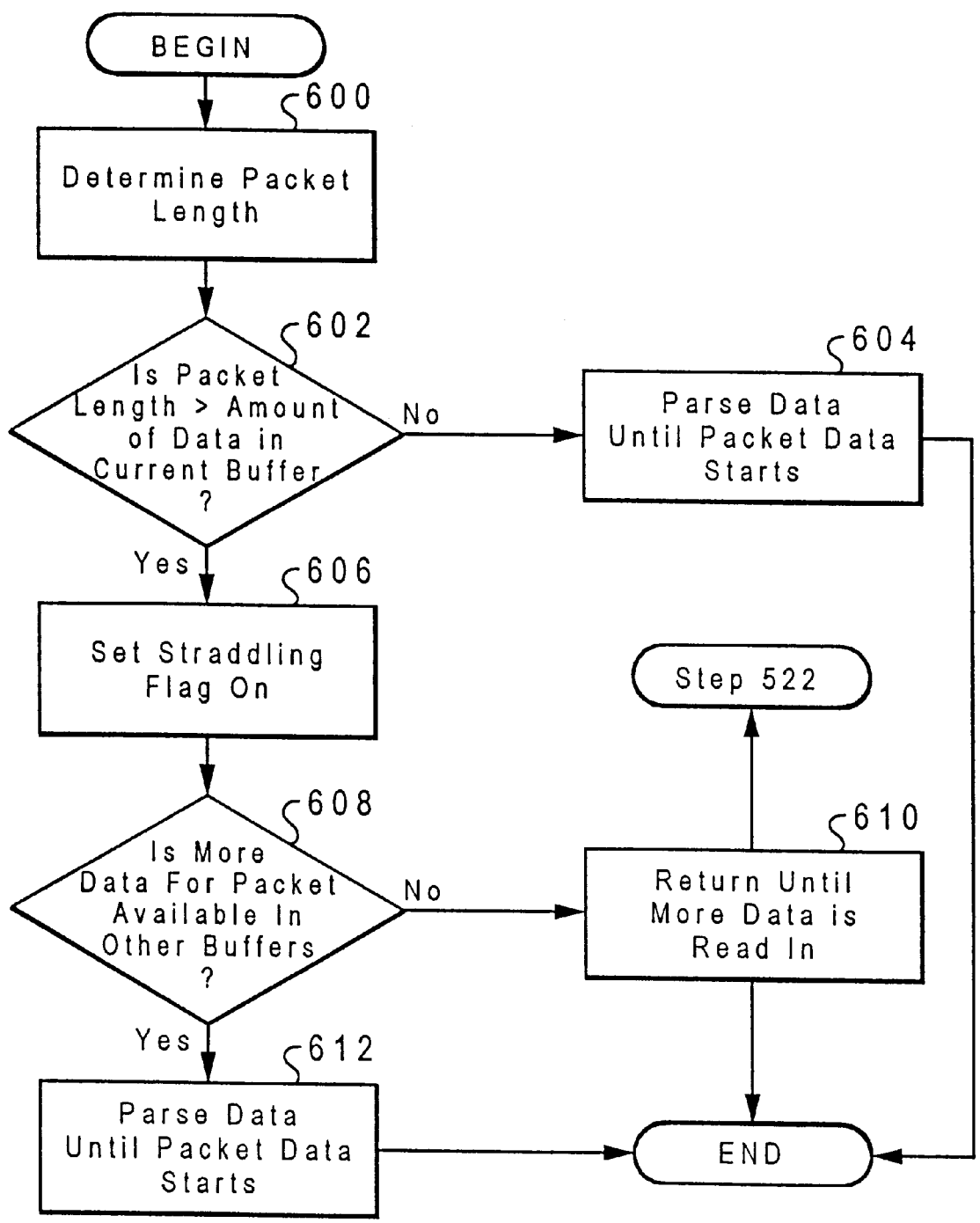
FIG. 6 is a flowchart of a process for packetizing data in a buffer according to the present invention.

With reference to FIG. 6, a flowchart of a process for packetizing buffer data is depicted according to the present invention. The process begins by determining the packet length (step 600). Thereafter, a determination is made as to whether the packet length is greater than the amount of data in the current buffer (step 602). If the packet length is not greater than the amount of data in the current buffer, the process then parses data until a video or audio packet data start (step 604), with the process terminating thereafter. Otherwise, the process sets the straddling flag to an on state (step 606). Thereafter, a determination is made as to whether more data for the packet is available in other buffers (step 608). If additional data is not available in other buffers, the process then returns until more data is read into the buffer (step 610) with the process then proceeding to step 522 in FIG. 5. If additional data for the packet is available and other buffers, the process then parses its data until the packet data starts (step 612) with the process terminating thereafter.

Figure 7:
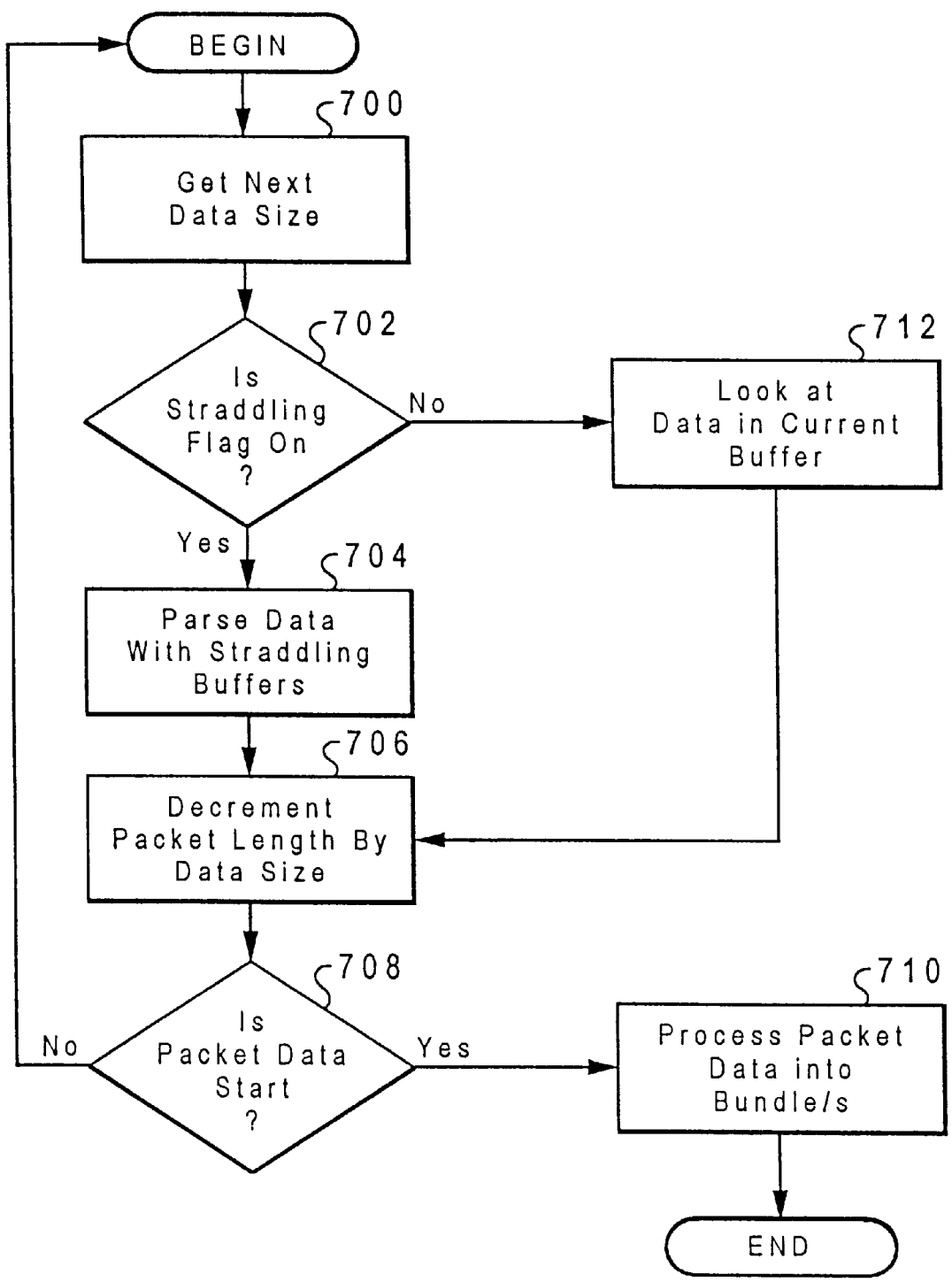
FIG. 7 is a flowchart of a process for parsing data until packet data starts occurs according to the present invention.

Turning next to FIG. 7, a flowchart of a process for parsing data until the packet data start is depicted according to the present invention. The buffer length is decrementecl for all data skipped over that is not bundled during the parsing of data. FIG. 7 is a more detailed description of steps 604 and 612 from FIG. 6. The process begins by getting the next data size (step 700). The data size will be the size of the next item to parse that is not a packet start. Thereafter, a determination is made as to whether the straddling flag is on (step 702). If the straddling flag is on, the process then parses data with straddling buffers because the data to be parsed may cross over a buffer including elementary data types that comprise multiple bytes (step 704). Thereafter, the packet length is decremented by the data size (step 706). Thereafter, a determination is made as to whether the packet data has been reached (step 708). If packet data has not been reached, the process returns to step 700. Otherwise, the process then processes data packet into bundles (step 710). With reference again to step 702, if the straddling flag is not in the on state, the process then looks at the data only in the current buffer (step 712) with the process then proceeding to step 706 as previously described.

Figure 8:
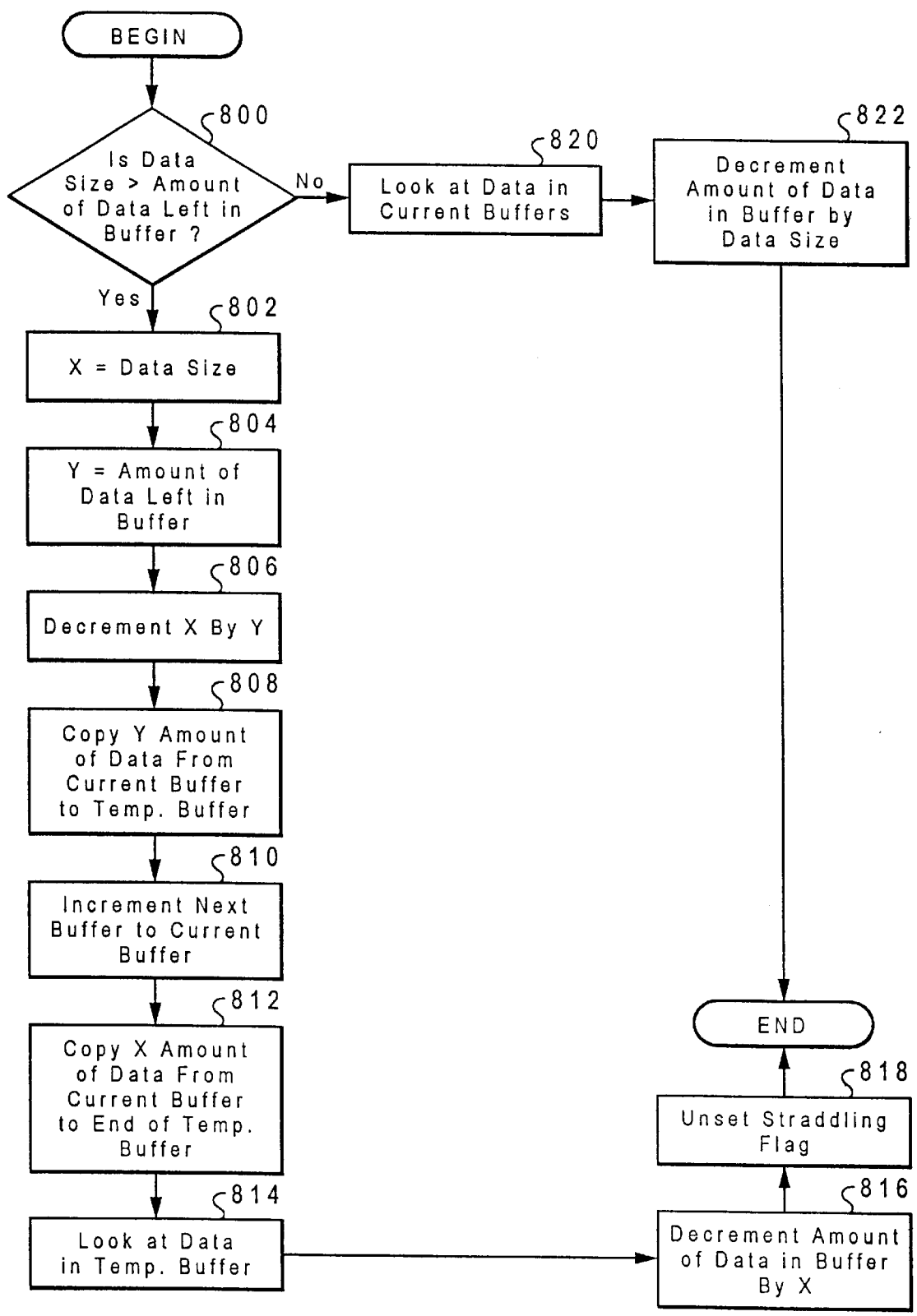
FIG. 8 is a flowchart of a process for parsing data with straddling buffers according to the present invention.

With reference now to FIG. 8, a flowchart of a process for parsing data with straddling buffers is depicted according to the present invention. FIG. 8 is a more detailed description of step 704 in FIG. 7. The process begins by determining whether the data size is greater than the amount of data left in the buffer (step 800). If the data size is greater than the amount of data left in the buffer, the process then sets x equal to the data size (step 802) and sets y equal to the amount of data left in the buffer (step 804). Thereafter, x is decremented by y (step 806). The process then copies a y amount of data from the current buffer to a temporary buffer (step 808). Next, the next buffer is incremented to the current buffer (step 810). Then, an x amount of data is copied from the current buffer to the end of the temporary buffer (step 812). Then the data in the temporary buffer is examined (step 814). The amount of data in the current buffer is decremented by x (step 816). Step 816 is performed so that the process can determine when the buffer has been entirely consumed. Thereafter, the straddling flag is unset (step 818) with the process then terminating.

With reference again to step 800, if the data size is not greater than the amount of data left in the buffer, the process then looks at the data in the current buffer (step 820). Next, the data in the buffer is decremented by the data size (step 822) with the process terminating thereafter.

Figure 9:
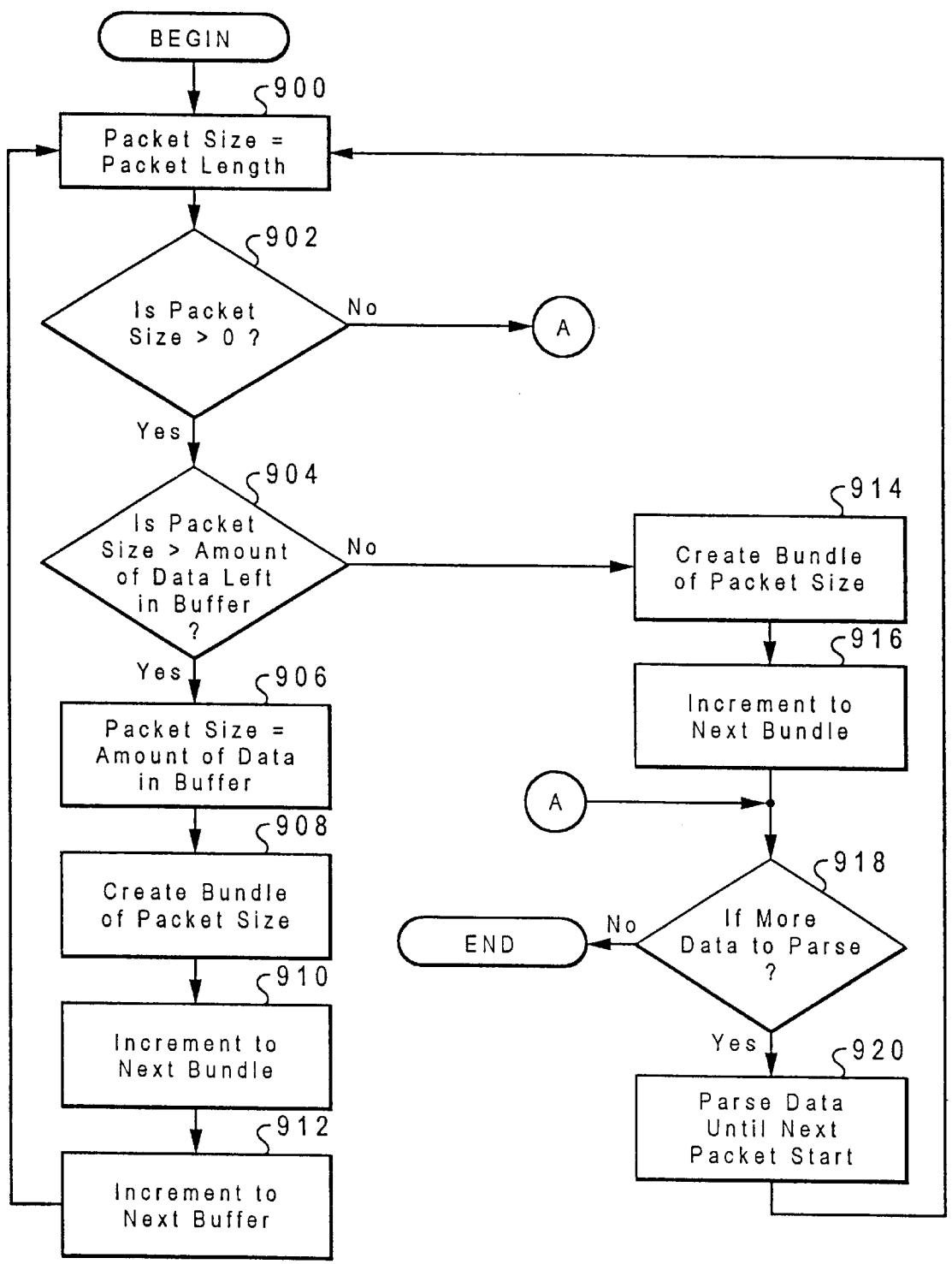
FIG. 9 is a flowchart of a process for processing data into a bundle according to the present invention.

With reference now to FIG. 9, a flowchart of a process for processing data into a bundle is depicted according to the present invention. FIG. 9 is a more detailed flowchart of the process depicted in step 810 in FIG. 8. The process begins by setting a variable packet size equal to the packet length (step 900). The packet length is identified from information within the packet itself. Next, a determination is made as to whether the packet size is greater than zero (step 902). If the variable packet size is greater than zero, the process then determines whether the packet size is greater than the amount of data left in the buffer (step 904). If the packet size is greater than the amount of data left in the buffer, the process then sets the packet size equal to the amount of data in the buffer (step 906). Next, a bundle having a size set by the variable packet size is created (step 908). The process then increments to the next bundle (step 910). Then, the process increments to the next buffer (step 912) with the process then returning to step 900.

With reference again to step 904, if the packet size is not greater than the amount of data left in the buffer, the process then creates a bundle having a size set by the variable packet size (step 914). Thereafter, the process increments to the next bundle (step 916) and determines whether more data is present to parse (step 918). If more data is not present to parse, the process then terminates. Otherwise, the process parses data until the next packet start (step 920) with the process then returning to step 900 as previously described. Step 920 is described above in more detail in FIG. 7.

With reference again to step 902, if the packet size is not greater than zero, the process proceeds to step 918 directly.

Figure 10:
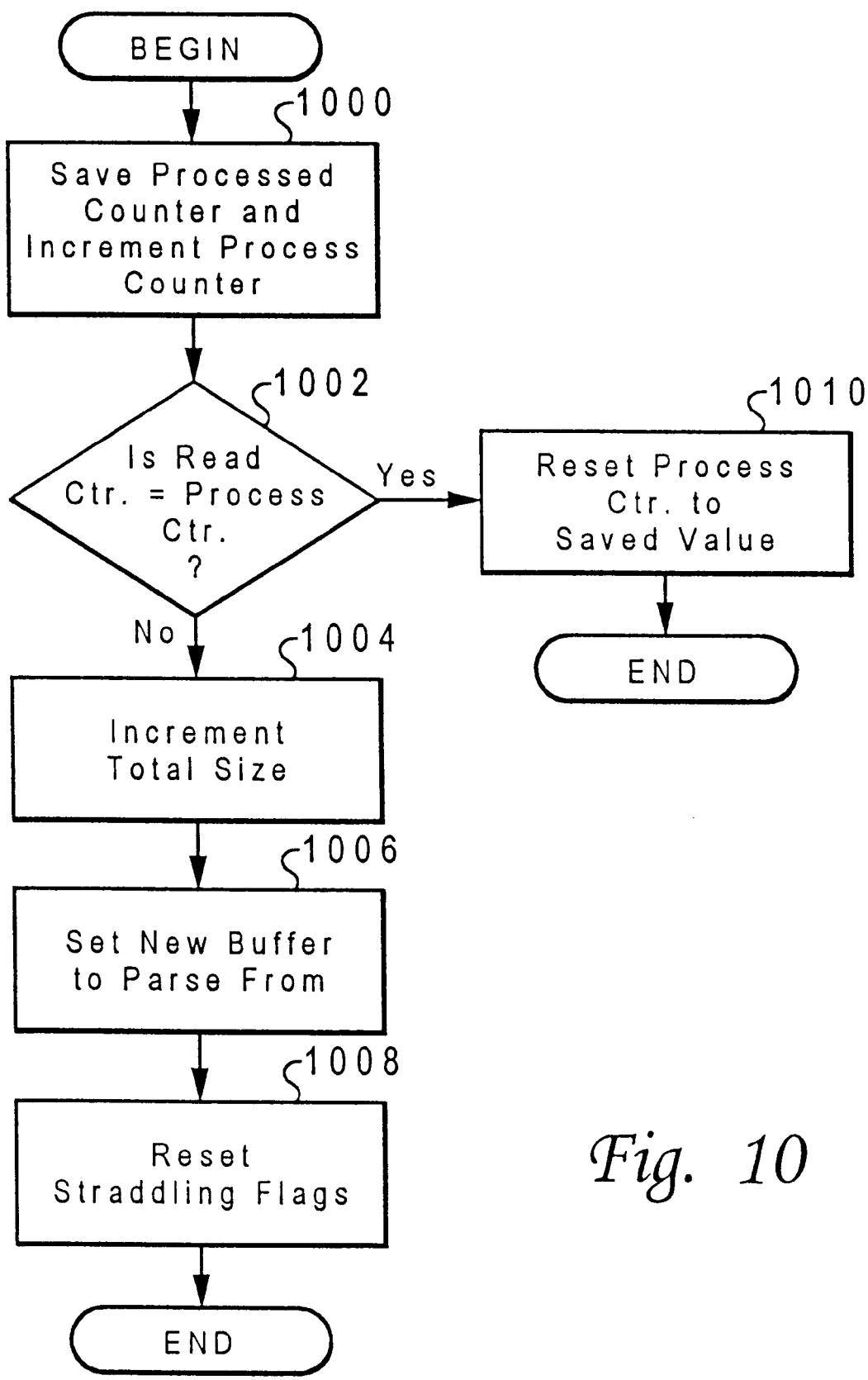
FIG. 10 is a flowchart of a process for incrementing buffers to process according to the present invention.

With reference now to FIG. 10, a flowchart of a process for incrementing buffers to process is depicted according to the present invention. FIG. 10 is a detailed flowchart of the process illustrated in step 912 in FIG. 9. The process begins by saving a processed counter and then incrementing the process counter (step 1000). Thereafter, a determination is made as to whether the read counter is equal to the process counter (step 1002). If the read counter is not equal to the process counter, the process then increments the variable total size (step 1004). Thereafter, the new buffer is set from which parsing is to occur (step 1006). Then, the straddling flags are reset (step 1008) with the process then terminating to step 1000.

With reference again to step 1002, if the read counter is equal to the process counter, the process then resets the process counter to the original value (step 1010). Then, the process terminates with processing of the buffer.

Figure 11:
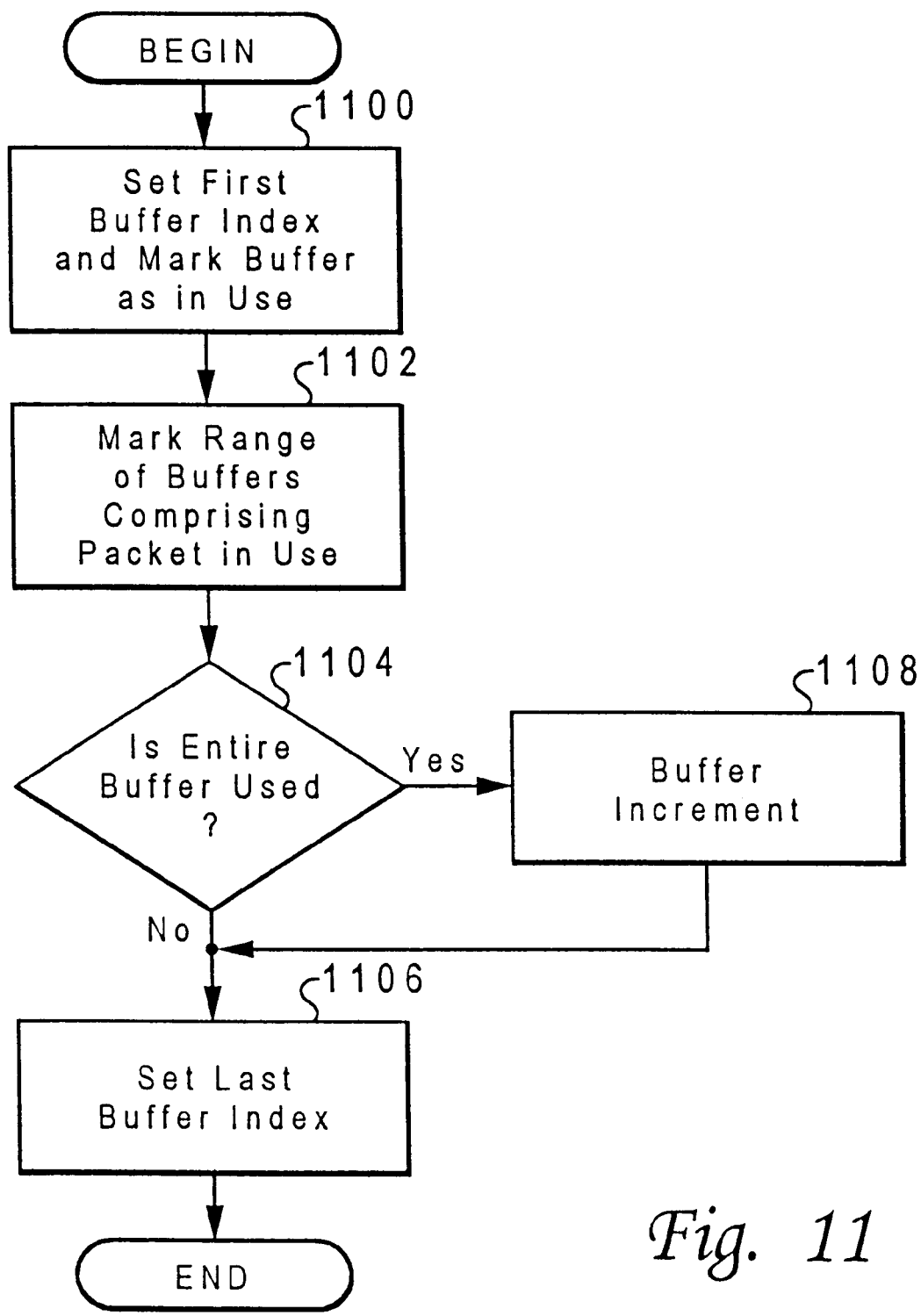
FIG. 11 is a flowchart of a process for setting up buffers to process according to the present invention.

Turning next to FIG. 11, a flowchart of a process for setting up buffers to process is depicted according to the present invention. The process begins by marking the buffer as being in use and sets the first buffer index (step 1100). Thereafter, a range of buffers comprising the packet is marked as in use (step 1102). Then, a determination is made as to whether an entire buffer is used (step 1104). If an entire buffer is not used, the process then sets the last buffer index (step 1106). If in step 1104, the entire buffer is not used, the process then increments to the next buffer (step 1108) with the process then proceeding to step 1106 as previously described.

Figure 12:
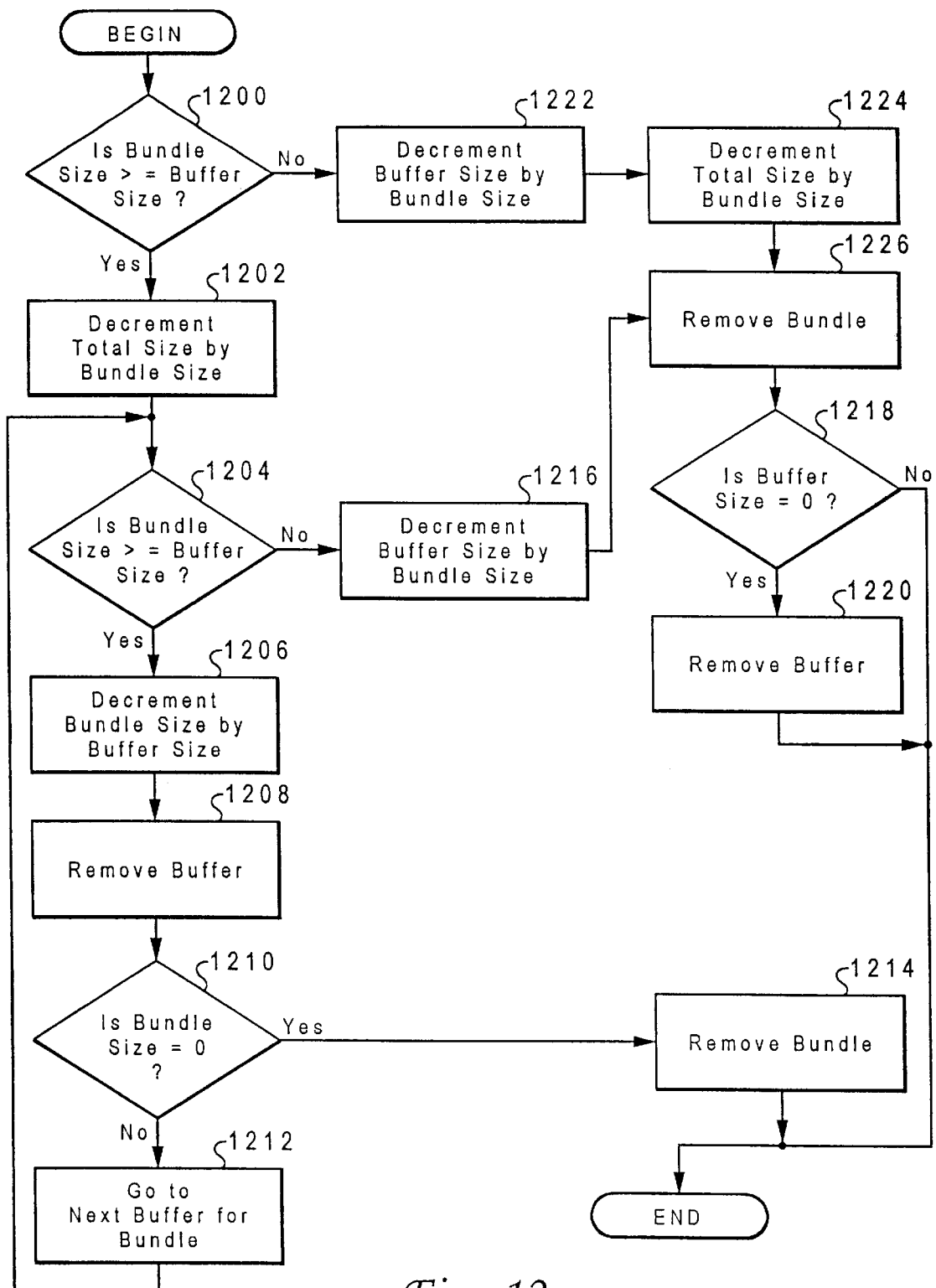
FIG. 12 is a flowchart of a process for removing data bundles from buffers according to the present invention.

With reference now to FIG. 12, a flowchart of a process for removing data bundles from buffers is depicted according to the present invention. The process begins by determining whether the bundle size is greater or equal than the buffer size (step 1200). If the bundle size is greater than or equal to the buffer size, the process then decrements the total size by the bundle size (step 1202). Next, a determination is made as to whether the bundle is greater than or equal to the buffer size (step 1204). If the bundle size is still greater than or equal to the buffer size, the process then decrements the bundle size by the buffer size (step 1206). Thereafter, the buffer is removed (step 1208). A determination is then made as to whether the bundle size is equal to zero (step 1210). If the bundle size is not equal to zero, the process then proceeds to the next buffer for the packet (step 1212). Thereafter, the process returns to step 1204 as previously described. With reference again to step 1210, if the bundle size is equal to zero, the bundle is removed (step 1214) with the process terminating thereafter. With reference again to step 1204, if the bundle size is greater than or equal to the buffer size, the process then decrements the buffer size by the bundle size (step 1216). Next, the bundle is removed (step 1226). Thereafter, a determination is made as to whether the buffer size is equal to zero (step 1218). If the buffer size is equal to zero, the buffer is removed (step 1220) and the process then terminates. Otherwise, the process proceeds to terminate directly from step 1218.

With reference again to step 1200, if the bundle size is greater than or equal to the buffer size, the process then decrements the buffer size by the bundle size (step 1222). Thereafter, the total size is decremented by the bundle size (step 1224). The process then removes the bundle (step 1226). Then, the process proceeds to step 1218 as described previously. The total size is employed to determine when all of the buffers have been processed. This occurs when total size becomes zero.

Figure 13:
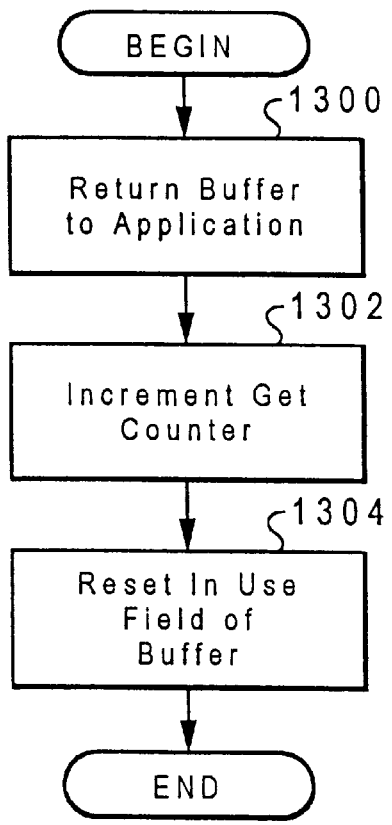
FIG. 13 is a flowchart of a process for removing buffers according to the present invention.

With reference now to FIG. 13, a flowchart of a process for removing buffers is depicted according to the present invention. The process begins by returning the buffer to the application (step 1300). Thereafter, the get counter is incremented by (step 1302), the in use field of data structure representing the buffer (step 1304).

The process provides a buffered play in which a consistent streaming mechanism for packetizing buffers and. continuously processing data stream occurs. The present invention also provides an advantage in which minimal memory is used as the buffer memory for each of the packets. Only the buffer memory is used with a very small internal buffer to handle data straddle across two buffers and as packets are consumed.

Additionally, the present invention allows buffers to be returned to the application in a consistent manner indicating that the buffer has been entirely processed, preventing the application from receiving too many buffers and causing bottlenecks. Furthermore, the present invention provides an advantage in which variable size buffers are employed to packetize the data. For example, in MPEG transport streams in which data is aligned on 188 byte boundaries, data may be coalesced into large bundles, which comprise several buffers because the small buffers take too much time to pass data to hardware. For other examples, larger buffers have been employed containing several packets to minimize buffer requests. Finally, the buffered play provides an application more control over its data streaming in that interactive application can seamlessly change to a different point in its data stream without the high cost of telling the data engine retrieving data to seek and reset itself.

Figure 14:
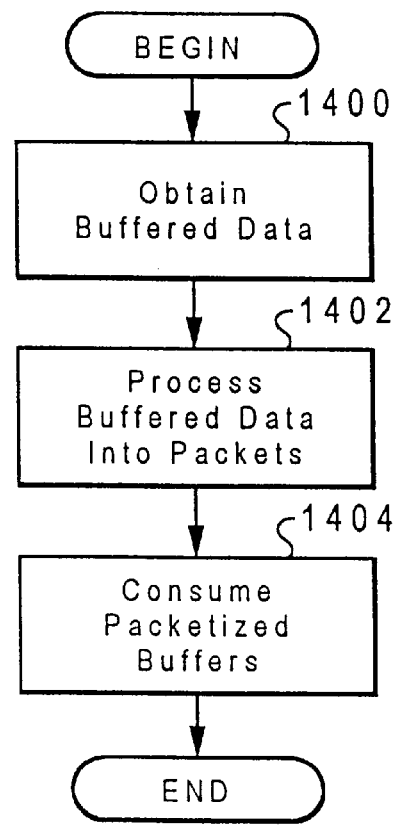
FIG. 14 is a flowchart of a process for an external interface for use in buffered play according to the present invention.

With reference to FIG. 14, a flowchart of a process for an external interface for use in buffered play according to the present invention. The process begins by obtaining the buffered data (step 1400). In obtaining the buffered data, the application passes the maximum number of buffers to the interface. Thereafter, the interface allocates a dynamic array based on the maximum number of buffers passed by the application and initializing a counter to this maximum number. The application then indicates to the interface that it is ready to pass buffers. Next, the engine starts requesting buffers in response to this. Additionally, a read counter is incremented and the first buffer is set up to be processed. For each buffer returned by the application, the interface increments the read counter, sets the pointer to the buffer in the allocated buffer array and decrements get counter until the entire buffer array is full. Next, the interface processes the buffered data into packets (step 1402). In processing each buffer, a process counter is maintained until the index reaches the read counter set in step 1400. In processing buffered packets into packets, the present invention handles packets that map to multiple buffers and buffers that contain multiple packets. Thereafter, the packetized buffers are consumed as bundled units (step 1404). As each bundle is consumed, the packets are discarded along with the associated buffers. As each buffer is returned to the application, the position is zeroed out so that future reads will know that the position can be filled with a new buffer. Additionally, the Get counter is incremented to indicate additional buffers can be read in.

With reference now to FIG. 15, a diagram of a movie file containing different scenes is depicted according to the present invention. The process of the present invention may be employed to move from scene to scene within file 1500, which contains audio and video data for various scenes. Typically, an application starts at point 1502 and presents audio and video on a data processing system. Prior to point 1504, the application typically receives input and determines whether to present data from point 1504 or if point 1506 is the next point to present. After point 1504, the process continues to read buffers from point 1504. If point 1506 is to be presented, the application seeks point 1506 and starts to play after flushing buffers with unused data. At that time, the process continues to read buffers from point 1506. Such a process continues until an application ends. Each point contains a correct sync point allow the present invention to successfully start decoding from the new position. The movie file may be sent to a data processing system in the form of a multimedia data stream for processing according to the present invention. The movie file and other multimedia data may originate from a number of different sources, such as a remote network data processing system, a hard disk drive, or a CD-ROM.

According to the present invention, future data reads may occur for every empty slot that does not contain a buffer. As buffers are processed, the in use field indicates the slot is in use and as buffers are consumed through a packetized method, the buffer slot is emptied. The buffer array is circular in that as the end is reached, indexes are reset to the beginning.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method in a data processing system for processing a data stream, the method comprising:

receiving the data stream;

parsing the data stream into data packets;

storing the data packets in a plurality of buffers;

determining whether a data packet stored within the plurality of buffers is stored within more than one buffer within the plurality of buffers;

dividing the data packets into a plurality of bundles, in response to a presence of a data packet being stored within more than one buffer within the plurality of buffers, wherein the plurality of bundles are associated with each other for procecsing;

sending the plurality of bundles to an audio decoder in response to a presence of audio data within the plurality of bundles; and sending the pluaity of bundles to a video decoder to a response to a presence of video data within the plurality of bundles.

2. The method of claim 1 further comprising:

determining whether audio data packets are present within the plurality of data packets; and sending audio data packets within the plurality of data packets to an audio decoder in response to a determination that audio data packets are present.

3. The method of claim 1 further comprising:

determining whether video data packets are present within the plurality of data packets; and sending video data packets within the plurality of data packets to a video decoder in response to a determination that video data packets are present.

4. The method of claim 1, wherein the data packet is stored within a first buffer and a second buffer within the plurality of buffers and wherein the step of dividing the data packet into a plurality of bundles comprises:

determining a first amount of data for the data packet in the first buffer;

creating a first bundle using the first amount of data for the first data packets;

determining a second amount of data for the data packet in the second buffer; and creating a second bundle using the second amount of data for the data packet, wherein the first bundle and the second bundle are associated with each other for processing.

5. The method of claim 4, wherein the plurality of buffers are received from an application and further comprising:

associating the first buffer with the second buffer using a first buffer index and a last buffer index with the first and second bundle; and returning the first buffer and the second buffer to the application in response to processing of the first and second bundle.

6. The method of claim 1, wherein the data packet is stored within a number of buffers within the plurality of buffers and wherein the step of dividing the data packet into a plurality of bundles comprises:

determining, for each buffer within the number of buffers, and an amount of data for the data packet;

creating, for each buffer, a bundle for the amount of data, wherein a number of bundles are created for processing.

7. The method of claim 1, wherein the plurality of buffers are received from an application and further comprising:

returning a buffer within the plurality of buffers to the application in response to all data within the buffer being processed.

8. The method of claim 1, wherein the data stream includes audio data.

9. The method of claim 1, wherein the data stream includes video data.

10. The method of claim 1, wherein the data stream is a MPEG-1 data stream.

11. The method of claim 1, wherein the data stream is a MPEG-2 data stream.

12. A method in a data processing system for processing a data stream, the method comprising:

receiving the data stream;

parsing the data stream into data packets;

storing the data packets in a plurality of buffers;

determining whether a data packet stored within the plurality of buffers is stored within more than one buffer within the plurality of buffers;

dividing the data packet into a plurality of bundles, in response to a presence of a data packet being stored within more than one buffer within the plurality of buffers, wherein the plurality of bundles are associated with each other for processing; and sending the plurality of bundles to an audio decoder in response to a presence of audio data within the plurality of bundles.

13. A method in a data processing system for processing a data stream, the method comprising:

receiving the data stream;

parsing the data stream into data packets;

storing the data packets in a plurality of buffers;

determining whether a data packet stored within the plurality of buffers is stored within more than one buffer within the plurality of buffers;

dividing the data packet into a plurality of bundles, in response to a presence of a data packet being stored within more than one buffer within the plurality of buffers, wherein the plurality of bundles are associated with each other for processing; and sending the plurality of bundles to a video decoder in response to a presence of video data within the plurality of bundles.

14. A data processing system for processing a data stream, the data processing system comprising:

receiving means for receiving the data stream;

parsing means foe parsing the data stream into data packets;

storage means for storing the data packets in a plurality of buffers;

determination means for determining whether a data packet stored within the plurality of buffers is stored in more than one buffer within the plurality of buffers;

creation means for creating a plurality of bundles from the dalta packet, in response to the data packet being stored within more than one buffer;

first sending means for sending the plurality of bundles to an audio decoder in response to a presence of audio data within the plurality of bundles; and second sending means for sending the plurality of bundles to a video decoder in response to a presence of video data within the plurality of bundles.

15. The data processing system of claim 14 further comprising:

second determination means for determining whether audio data packets are present within the packets; and sending audio data packets within the plurality of data packets to an audio decoder in response to a determination that audio packets are present.

16. The data processing system of claim 14 further comprising:

second determination means for determining whether video data packets are present within the packets; and sending means for sending video data packets to a video decoder in response to the determination that video data is present.

17. The data processing system of claim 14, wherein the data packet is stored within a first buffer and a second buffer within the plurality of buffers and wherein the dividing means comprises:

means for determining a first amount of data for the data packet within the first buffer;

means for creating a first bundle from the first amount of data;

means for determining a second amount of data for the data packet within the second buffer; and means for creating a second bundle from the second amount of data, wherein the first bundle and the second bundle are associated with each other for processing.

18. The data processing system of claim 17, wherein the plurality of buffers are received from an application and further comprising:

association means for associating the first buffer with the second buffer using a first buffer index and a last buffer index; and return means for returning the first buffer and the second buffer to the application in response to processing of the first and second bundle.

19. The data processing system of claim 14, wherein the data packet is stored within a number of buffers within the plurality of buffers and wherein the dividing means comprises:

means for determining, for each buffer within the number of buffers, and amount of data for the data packets; and means for creating, for each buffer within the number of buffers, a bundle for the amount of data, wherein a number of bundles are created for processing.

20. The data processing system of claim 14, wherein the plurality of buffer are received from an application and further comprising:

means for returning a buffer within the plurality of buffer to the application in response to all data within the buffer being processed.

21. The data processing system of claim 14, wherein the data processing stream includes audio data.

22. The data processing system of claim 14, wherein the data stream includes video data.

23. The data processing system of claim 14, wherein the data stream is an MPEG-1 data stream.

24. The data processing system of claim 14, wherein the data stream is an MPEG-2 data stream.

25. A data processing system for processing a data stream, the data processing system comprising:

receiving means for receiving the data stream;

parsing means for parsing the data stream into data packets;

storage means for storing the data packets in a plurality of buffers;

determination means for determining whether a data packet stored within the plurality of buffers is stored in more than one buffer within the plurality of buffers;

creation means for creating a plurality of bundles from the data packet, in response to the data packet being stored within more than one buffer; and sending means for sending the plurality of bundles to an audio decoder in response to a presence of audio data within the plurality of bundles.

26. A data processing system for processing a data stream, the data processing system comprising:

receiving means for receiving the data stream;

parsing means for parsing the data stream into data packets;

storage means for storing the data packets in a plurality of buffers;

determination means for determining whether a data packet stored within the plurality of buffers is stored in more than one buffer within the plurality of buffers;

creation means for creating a plurality of bundles from the data packet, in response to the data packet being stored within more than one buffer; and sending means for sending the plurality of bundles to a video decoder in response to a presence of video data within the plurality of bundles.

27. A multimedia adapter for processing a multimedia data stream, the adapter comprising:

input means for receiving the multimedia data stream;

parsing means for parsing the multimedia data stream into data packets;

storage means for storing the data packets in a plurality of buffers;

a determination means for determining whether a data packet stored within the plurality of buffers is stored within more than one buffer within the plurality of buffers;

creation means for creating a plurality of bundles from the data packet in response to the data packet being stored within more than one buffer within the plurality of buffers;

first sending means for sending the plurally of bundles to an audio decoder in response to a presence of audio data within the plurality of bundles; and second sending means for sending the plurality of bundles to a video decoder in response to a presence of video data within the plurality of bundles.

28. A method in a data processing system for decoding a multimedia data stream, the method comprising:

receiving the multimedia data stream;

parsing the multimedia data stream into data packets;

storing the data packets in a plurality of buffers;

determining whether a data packet stored within the plurality of buffers is stored within more than one buffer within the plurality of buffers;

dividing the data packet into a plurality of bundles, in response to a presence of a data packet being stored within more than one buffer within the plurality of buffers, wherein the plurality of bundles are associated with each other for processing; and decoding the plurality of bundles to form a multimedia presentation.

29. A computer program product for use with a data processing system for processing a data stream, the computer program product comprising:

computer usable medium;

first instructions for receiving the data stream;

second instructions for parsing the data stream into data packets;

third instructions for storing the data packets in a plurality of buffers;

fourth instructions for determining whether a data packet stored within the plurality of buffers is stored within more than one buffer within the plurality of buffers;

fifth instructions for dividing the data packet into a plurality of bundles, in response to a determination that the data packet is stored within more than one buffer, wherein the instructions are embodied within the computer useable medium;

sixth instructions for sending the plurality of bundles to an audio decoder in response to a presence of audio data within the plurality of bundles; and seventh instructions for sending the plurality of bundles to a video decoder in response to a presence of video data within plurality of bundles.

30. A method in a data processing system for processing a data stream, the method comprising:

receiving the data stream;

parsing the data stream into data packets;

storing the data packets in a plurality of buffers;

determining whether a data packet stared within the plurality of buffers spans more than one buffer within the plurality of buffers;

responsive to a presence of a data packet spanning more than one buffer within the plurality of buffers, dividing the data packet into a plurality of bundles, wherein each bundle within the plurality of bundles is located entirely within a single buffer within the plurality of buffers;

sending the plurality of bundles to an audio decoder in response to a presence of audio data within the plurality of bundles; and sending the plurality of bundles to a video decoder in response to a presence of video data within the plurality of bundles.

31. The method of claim 30, wherein the plurality of bundles are associated with each other for processing.

32. The method of claim 30, wherein the data stream includes audio data and video data.

33. An apparatus for processing a data stream, the apparatus comprising:

input means receiving the data stream;

parsing means for parsing the data stream into data packets;

storage means for storing the data packets in a plurality of buffers;

determination means for determining whether a data packet stored within the plurality of buffers spans more than one buffer within the plurality of buffers; and creation means, responsive to the data packet spanning more than one buffer within the plurality of buffers, for creating a plurality of bundles from the data packet, wherein each bundle within the plurality of bundles is located within a single buffer;

first sending means for sending the plurality of bundles to an audio decoder in response to a presence of audio data within the plurality of bundles; and second sending means for sending the plurality of bundles to a video decoder in response to a presence of video data within the plurality of bundles.

* * * * *

UNITED STATES PATENT AND TRADEMARK OFFICE
CERTIFICATE OF CORRECTION

PATENT NO. : 5,946,318
DATED : August 31, 1999
INVENTOR(S) : Lauren Lee Post

It is certified that error appears in the above-identified patent and that said Letters Patent is hereby corrected as shown below:

Column 1, line 16 remove "crowing" and insert - - growing - -;

Column 8, line 57 remove "." between "and. contin-";

Column 10, line 37 remove "pluaity" and insert - - plurality - -;

Column 12, line 4 remove "foe" and insert - - for - -;

Column 14, line 24 before "computer usable" insert - - a - -;

Column 14, line 44 after "within" insert - - the - -;

Column 14, line 51 remove "stared" and insert - - stored - -.

Signed and Sealed this

Twenty-fifth Day of April, 2000

Attest:

Q. TODD DICKINSON

Attesting Officer

Director of Patents and Trademarks